(12) United States Patent
Kirschey

(10) Patent No.: US 6,244,964 B1
(45) Date of Patent: Jun. 12, 2001

(54) FLEXIBLE SHAFT COUPLING

(75) Inventor: Gerhard Kirschey, Wuppertal (DE)

(73) Assignee: Centa-Artriebe Kirschey GmbH, Haan (DE)

( * ) Notice: Subject to any disclaimer, the term of this patent is extended or adjusted under 35 U.S.C. 154(b) by 0 days.

(21) Appl. No.: 09/149,962

(22) Filed: Sep. 9, 1998

(30) Foreign Application Priority Data

Sep. 9, 1997 (DE) .............................................. 197 39 334

(51) Int. Cl.$^7$ ...................................................... F16D 3/52
(52) U.S. Cl. ................................................ 464/74; 464/76
(58) Field of Search ................................. 464/23, 74, 76, 464/87, 89, 90, 158, 159; 403/359.4

(56) References Cited

U.S. PATENT DOCUMENTS

| 2,125,559 | 8/1938 | Hamill . | |
|---|---|---|---|
| 2,184,183 | 12/1939 | Fykse . | |
| 2,326,450 | * 8/1943 | Fawick | 464/76 X |
| 2,548,839 | * 4/1951 | Coombes | 464/89 X |
| 2,696,124 | * 12/1954 | Flowers et al. | 464/158 X |
| 3,237,469 | * 3/1966 | Berry et al. | 464/23 X |
| 3,575,015 | * 4/1971 | Geisthoff | 464/23 |
| 3,620,044 | * 11/1971 | Latour | 464/74 |
| 5,657,545 | 8/1997 | Haworth . | |

FOREIGN PATENT DOCUMENTS

| 26 30 506 | 1/1978 | (DE) . |
|---|---|---|
| 2176335 | 10/1973 | (FR) . |
| 2350501 | 12/1977 | (FR) . |

\* cited by examiner

*Primary Examiner*—Lynne H. Browne
*Assistant Examiner*—Greg Binda
(74) *Attorney, Agent, or Firm*—Herbert Dubno; Andrew Wilford

(57) ABSTRACT

A coupling has an inner member centered on and rotatable about an axis A and formed with a plurality of radially outwardly projecting short inner teeth and a radially outwardly projecting long tooth together defining a plurality of radially outwardly open pockets. The outer end of the long inner tooth defines an orbit centered on the axis and the outer ends of the short inner teeth lie radially inward of this orbit. An outer member coaxially surrounding the inner member is formed with a plurality of radially inwardly projecting short outer teeth and a radially inwardly projecting long outer tooth together defining a plurality of radially inwardly open pockets. The long teeth are angularly juxtaposed with each other and the inwardly open pockets each confront a respective one of the outwardly open pockets. The outer end of the long outer tooth defining an orbit centered on the axis and spaced inward of the orbit of the outer long tooth such that on relative rotation of the members and the long teeth cannot angularly pass each other. The outer ends of the short outer teeth lie radially outward of both orbits. Respective elastomeric bodies each engaged in a respective one of the inner pockets and the respective outer pocket angularly couple the members to each other.

4 Claims, 2 Drawing Sheets

FLEXIBLE SHAFT COUPLING

FIELD OF THE INVENTION

The present invention relates to a shaft coupling. More particularly this invention concerns such a coupling that permits some misalignment of the input and output axes and that also is angularly somewhat elastic.

BACKGROUND OF THE INVENTION

A standard flexible coupling has an inner member centered on and rotatable about an axis and formed with a plurality of radially outwardly projecting teeth defining a plurality of radially outwardly open pockets and each having an outer end. An outer member coaxially surrounding the inner member is centered on and rotatable about the axis and formed with a plurality of radially inwardly projecting teeth defining a plurality of radially inwardly open pockets and each having an inner end. The inwardly open pockets each confront a respective one of the outwardly open pockets and respective elastomeric bodies are each engaged in a respective one of the inner pockets and the respective outer pocket to angularly couple the members to each other.

As described in German patent document 2,630,506 of Hagin the outer ends of the inner teeth and the inner ends of the outer teeth can either overlap radially or be spaced from each other radially. When they overlap, as also described in U.S. Pat. No. 2,184,183 of Fykse, the elastomeric coupling bodies are stressed primarily in compression and it is impossible, even if the bodies are destroyed, for the members to rotate freely relative to each other, since in the absence of the coupling bodies the teeth will angularly engage each other. In the system where the outer ends of the inner teeth lie on a surface that is radially inward of the inner ends of the outer teeth, the bodies are stressed in shear and it is possible, if these bodies fail, for the two members to rotate freely relative to each other.

The main disadvantage of the system where the teeth overlap radially is that for a given rotation direction only every other coupling body is actually in use. The alternate bodies are wholly unstressed. When the teeth do not overlap, all the bodies are stressed and in use, regardless of rotation direction, but with this system in the event of overheating or some other situation that causes the bodies to fail, the coupling ceases to transmit torque at all.

OBJECTS OF THE INVENTION

It is therefore an object of the present invention to provide an improved flexible coupling.

Another object is the provision of such an improved flexible coupling which overcomes the above-given disadvantages, that is which uses all the coupling bodies at all times, yet which will transmit torque even if the coupling bodies fail or are missing.

SUMMARY OF THE INVENTION

A coupling has according to the invention an inner member centered on and rotatable about an axis and formed with a plurality of radially outwardly projecting inner first teeth and at least one radially outwardly projecting second tooth together defining a plurality of radially outwardly open pockets and each having an outer end. The outer ends of the first inner teeth define an inner orbit centered on the axis. An outer member coaxially surrounding the inner member is centered on and rotatable about the axis and is formed with a plurality of radially inwardly projecting first outer teeth and at least one radially inwardly projecting second outer tooth together defining a plurality of radially inwardly open pockets and each having an inner end. The second teeth are angularly juxtaposed with each other with none of the first teeth lying angularly between the second teeth. The inwardly open pockets each confront a respective one of the outwardly open pockets. The outer ends of the first outer teeth define an outer orbit centered on the axis and spaced outward of the inner orbit. One of the second teeth projects radially across both orbits and the other of the second teeth is complementarily offset from both orbits. Respective elastomeric bodies each engaged in a respective one of the inner pockets and the respective outer pocket angularly couple the members to each other.

Thus with this system during normal operation all the elastomeric bodies transmit torque between the two members as in a standard prior-art coupling. If these bodies fail, however, the teeth will come into angular direct engagement with each other so that the coupling will continue to transmit torque. Only if the elastomeric bodies fail do the two members shift angularly enough to bring the different-length teeth into engagement with each other; otherwise the system operates like a conventional coupling, with force transmission via all of the elastomeric bodies regardless of the rotation direction.

According to the invention there are an even number of inner teeth and of outer teeth. The second teeth alternate angularly with the first teeth. In addition the inner and outer members are provided with indicia that are axially aligned when the second teeth are juxtaposed with each other. Each pocket has a steep flank and a shallow flank. The second inner teeth project radially outward through the orbits.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
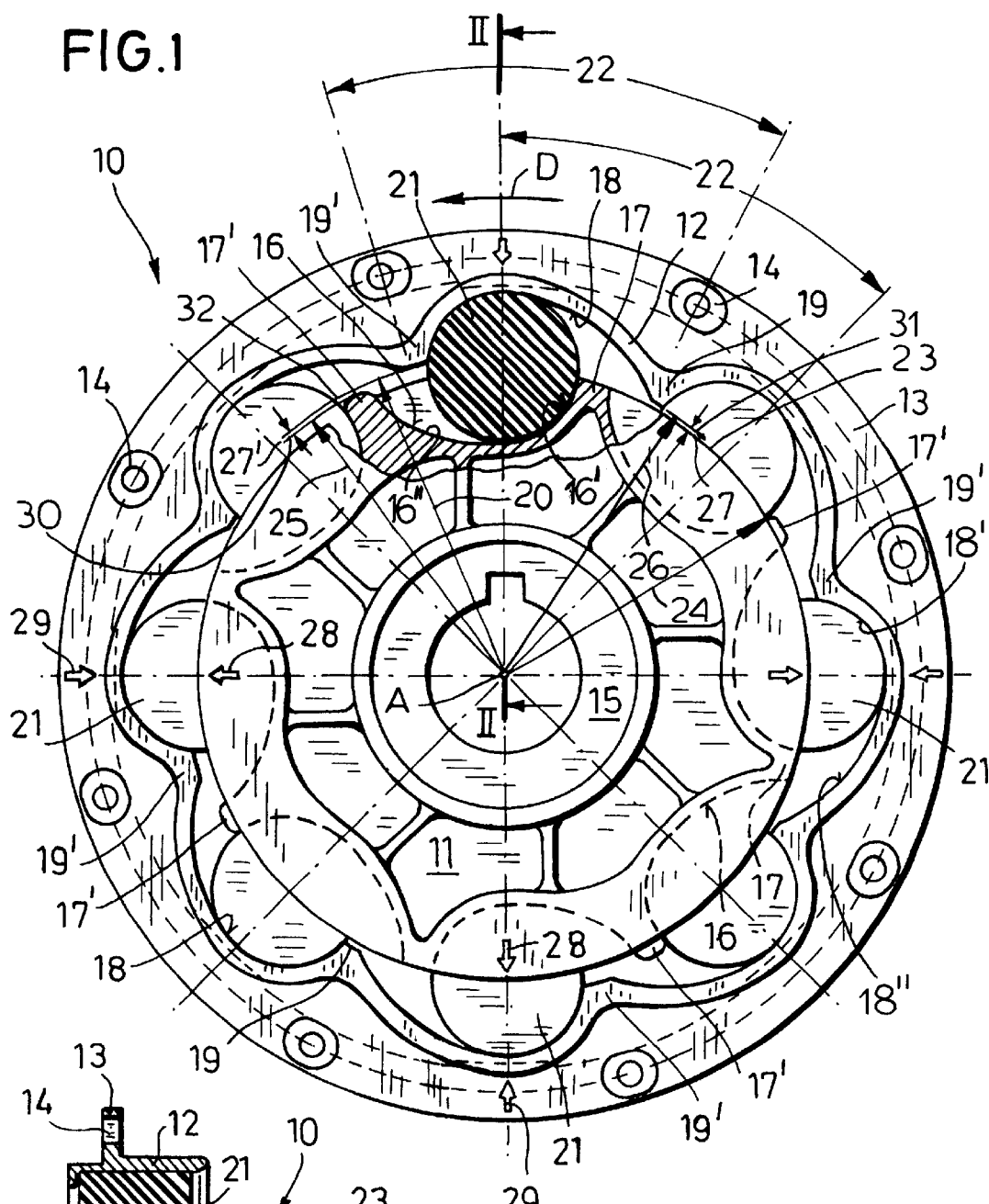
FIG. 1 is an end view partly in section through the coupling according to the invention.
Figure 2:
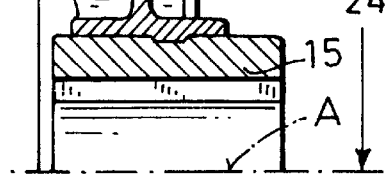
FIG. 2 is a section taken along line II—II of FIG. 1.
Figure 3:
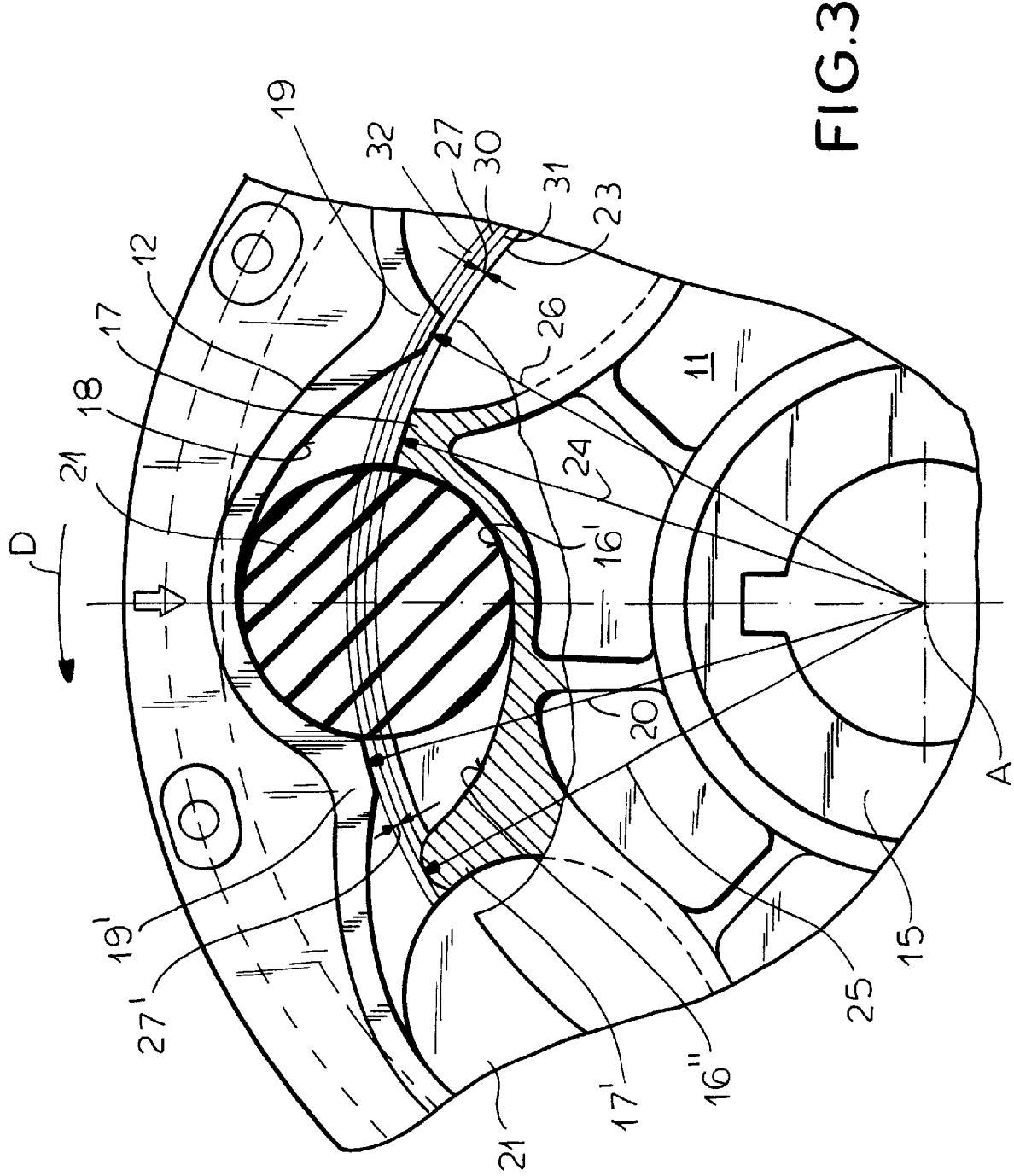
FIG. 3 is a large-scale view of a detail of FIG. 2.

As seen in FIGS. 1 and 2 a coupling 10 according to the invention has an inner member 11 centered on an axis A and an outer member 12 formed as a ring and also centered on the axis A. Normally the outer member 12 is driven, to which end it has a flange 13 that can be bolted through holes 14 to a driving element such as a flywheel of a diesel engine. The inner member 11 has a steel hub 15 on which it can be directly cast. Both members 11 and 12 are otherwise made of cast aluminum.

The inner member 11 is formed with four short radially outwardly projecting teeth 17 alternating with four long radially outwardly projecting teeth 17'. The short teeth 17 have outer ends defining an orbit 23 having a radius 24 (see also FIG. 2) and the long teeth 17' have outer ends defining an orbit 30 having a slightly larger radius 25. The outer member 12 is formed with four long radially inwardly projecting teeth 19 alternating with four short radially inwardly projecting teeth 19'. The short teeth 19 have inner ends defining an orbit 31 having a radius 26 slightly larger than the radius 25 and the long teeth 19' have inner ends defining an orbit 32 having a slightly smaller radius 20. Thus the teeth 17 and 19 define an annular gap 27 and the teeth 17' and 19' a similar gap 27' and all the teeth are spaced angularly apart by a dimension 22 of 45°.

The inner teeth 17 and 17' form radially outwardly open pockets 16 and the outer teeth 19 and 19' form confronting radially inwardly open pockets 18 in which are lodged elastomeric roller bodies 21 of solid cylindrical shape that serve to angularly couple the members 11 and 12 together. The members 11 and 12 are formed with respective marks or indicia 28 and 29 that are aligned when the pockets 16 and 18 are properly aligned, with the teeth 17 angularly ahead in a rotation direction D of the teeth 19. The pockets 16 and 18 have steep flanks 16' and 18' and shallow flanks 16" and 18" so that the compression of the bodies 21 during operation is somewhat different depending on the rotation direction.

Thus with this system during normal operation all the bodies 21 will transmit torque between the members 11 and 12, in either direction. The teeth 17 and 17' might during transmission of considerable torque come into alignment with the teeth 19 and 19', but the gaps 27 and 27' will allow them to do this without engaging each other. During such operation all of the elastomeric bodies 21 are in use transmitting torque between the two members 11 and 12.

Should, however, the bodies 21 fail, the outer member 12 will be able, for instance, to move back in direction D through the full distance 22 between adjacent teeth and its teeth 19' will engage the back faces of the teeth 17 while the teeth 17' similarly engage the teeth 19, forming a solid force-transmitting coupling. During such operation the springiness and flexibility of the bodies 21 is lost, but at least the coupling does not become totally nonfunctional.

In the illustrated embodiment long teeth 17' and 19' are alternated with short teeth 17 and 19. The system would, however, work equally if only one such pair of long teeth 17' and 19' were used.

I claim:

1. A coupling comprising:

an inner member centered on and rotatable about an axis and formed with a plurality of radially outwardly projecting short inner teeth and a radially outwardly projecting long tooth together defining a plurality of radially outwardly open pockets and each having an outer end, the outer end of the long inner tooth defining an orbit centered on the axis, the outer ends of the short inner teeth lying radially inward of the orbit;

an outer member coaxially surrounding the inner member, centered on and rotatable about the axis, and formed with a plurality of radially inwardly projecting short outer teeth and a radially inwardly projecting long outer tooth together defining a plurality of radially inwardly open pockets and each having an inner end, the long teeth being angularly juxtaposed with each other, the inwardly open pockets each confronting a respective one of the outwardly open pockets, the outer end of the long outer tooth defining an orbit centered on the axis and spaced inward of the orbit of the inner long tooth such that on relative rotation of the members the long teeth cannot angularly pass each other, the outer ends of the short outer teeth lying radially outward of both orbits; and respective elastomeric bodies each engaged in a respective one of the inner pockets and the respective outer pocket and angularly coupling the members to each other.

2. The coupling defined in claim 1 wherein there are an even number of long inner teeth, of short inner teeth, of long outer teeth, and of short outer teeth, the short teeth alternating angularly with the respective long teeth.

3. The coupling defined in claim 1 wherein the inner and outer members are provided with indicia that are radially aligned when the short teeth are juxtaposed with each other.

4. The coupling defined in claim 1 wherein each pocket has a steep flank and a shallow flank.

* * * * *